(12) United States Patent
Milford (10) Patent No.: US 10,568,253 B2
(45) Date of Patent: Feb. 25, 2020

(54) UNIVERSAL FRAME AND IMPLEMENT SYSTEM

(71) Applicant: TRAMAR, Inc., Commerce, GA (US)

(72) Inventor: Tracy Milford, Commerce, GA (US)

(*) Notice: Subject to any disclaimer, the term of this patent is extended or adjusted under 35 U.S.C. 154(b) by 196 days.

(21) Appl. No.: 15/730,965

(22) Filed: Oct. 12, 2017

(65) Prior Publication Data

US 2018/0228073 A1 Aug. 16, 2018

Related U.S. Application Data (60) Provisional application No. 62/457,513, filed on Feb. 10, 2017.

(51) Int. Cl.
| | | |
|---|---|---|
| *A01B 59/00* | (2006.01) |
| *A01B 63/102* | (2006.01) |
| *A01B 63/10* | (2006.01) |
| *B62D 63/08* | (2006.01) |
| *A01B 63/04* | (2006.01) |
| *A01B 59/042* | (2006.01) |
| *A01B 63/22* | (2006.01) |
| *A01B 23/04* | (2006.01) |
| *A01B 51/04* | (2006.01) |
| *B62D 63/06* | (2006.01) |

(52) U.S. Cl.
CPC .......... *A01B 59/002* (2013.01); *A01B 23/043* (2013.01); *A01B 51/04* (2013.01); *A01B 59/042* (2013.01); *A01B 63/04* (2013.01); *A01B 63/10* (2013.01); *A01B 63/102* (2013.01); *A01B 63/22* (2013.01); *B62D 63/062* (2013.01); *B62D 63/08* (2013.01)

(58) Field of Classification Search
CPC ..... A01B 59/002; A01B 59/042; A01B 63/04; A01B 63/10; A01B 63/102; A01B 63/22; A01B 23/043; A01B 51/04; B62D 63/062; B62D 63/08
See application file for complete search history.

(56) References Cited

U.S. PATENT DOCUMENTS

| | | | | | |
|---|---|---|---|---|---|
| 2,222,827 | A | * | 11/1940 | Zuger | B60D 1/14 172/324 |
| 2,784,985 | A | * | 3/1957 | Schnell | A01D 75/265 254/420 |
| 2,817,203 | A | * | 12/1957 | Sievers | A01B 31/00 172/684.5 |

(Continued)

FOREIGN PATENT DOCUMENTS

CA 2991334 A1 * 7/2018 ........... A01B 59/062

*Primary Examiner* — Jamie L McGowan (74) *Attorney, Agent, or Firm* — Smith Tempel Blaha LLC; Matthew T. Hoots (57) ABSTRACT

A small-scale land prep and maintenance equipment system includes a universal frame with a tongue element that includes an implement connection point (such as a through-hole or threaded hole) configured for receiving a saddle and bolt aspect of an implement. Advantageously, the implement connection point of the universal frame and the saddle of the implement provide for a robust and rigid connection between the universal frame and an implement while also enabling quick changeover of landscaping implements. Moreover, because the universal frame may be used on any number of implements, the cost of an integrated frame in each implement is avoided.

15 Claims, 5 Drawing Sheets

(56) References Cited

U.S. PATENT DOCUMENTS

| | | | | | |
|---|---|---|---|---|---|
| 2,892,504 | A | * | 6/1959 | Mowbray | A01B 39/19 111/68 |
| 2,934,357 | A | * | 4/1960 | Gewecke | A01D 45/028 172/439 |
| 2,991,570 | A | * | 7/1961 | Resler | E02F 3/7686 116/DIG. 13 |
| 3,007,266 | A | * | 11/1961 | Brand | E02F 3/765 172/273 |
| 3,031,208 | A | * | 4/1962 | Abbott | A01B 59/063 172/439 |
| 3,223,179 | A | * | 12/1965 | MacKenzie | A01B 35/06 172/310 |
| 3,255,831 | A | * | 6/1966 | Kirkpatrick, Jr. | A01B 19/02 172/611 |
| 3,295,611 | A | * | 1/1967 | Bunting | A01B 59/042 172/447 |
| 3,306,630 | A | * | 2/1967 | Weiste | A01B 59/062 172/272 |
| 3,437,153 | A | * | 4/1969 | Sandstead | A01B 39/19 172/39 |
| 3,487,882 | A | * | 1/1970 | Burton | A01B 35/30 172/310 |
| 3,557,892 | A | * | 1/1971 | Burrough | A01B 71/066 180/14.1 |
| 3,756,327 | A | * | 9/1973 | Orthman | A01B 35/22 172/691 |
| 3,981,517 | A | * | 9/1976 | Crochet, Sr. | B60D 1/26 280/478.1 |
| 4,066,131 | A | * | 1/1978 | Zandbergen | A01B 59/042 172/315 |
| 4,126,189 | A | * | 11/1978 | Channel | A01B 73/044 172/456 |
| 4,426,096 | A | * | 1/1984 | Rodrigues, Jr. | A01M 7/0082 280/412 |
| 4,482,166 | A | * | 11/1984 | Van Antwerp | B60D 1/40 172/272 |
| 5,743,339 | A | * | 4/1998 | Alexander, III | A01B 59/062 172/272 |
| 5,806,605 | A | * | 9/1998 | Keigley | E02F 3/7622 172/145 |
| 5,950,735 | A | * | 9/1999 | Godbersen | A01B 59/062 172/439 |
| 6,116,009 | A | * | 9/2000 | McLean | A01B 59/042 56/218 |
| 6,257,347 | B1 | * | 7/2001 | Campisi | A01B 59/068 172/439 |
| 7,093,380 | B2 | * | 8/2006 | Hubscher | E01H 5/06 172/679 |
| 7,849,614 | B2 | * | 12/2010 | Belzile | A01B 59/06 172/810 |
| 7,909,350 | B1 | * | 3/2011 | Landry | B60D 1/06 280/416.1 |
| 8,016,539 | B1 | * | 9/2011 | Potter | A01C 23/008 172/456 |
| 8,544,558 | B1 | * | 10/2013 | Seal | E02F 3/7663 172/72 |
| 8,763,715 | B2 | * | 7/2014 | Osgood | E01H 5/06 172/272 |
| 9,193,231 | B2 | * | 11/2015 | Bergum | B60D 1/02 |
| 10,324,486 | B1 | * | 6/2019 | Allen | G05G 1/02 |
| 2003/0221846 | A1 | * | 12/2003 | Rieke | A01B 59/00 172/19 |
| 2008/0104865 | A1 | * | 5/2008 | Bailey | E01H 5/06 37/231 |
| 2009/0236107 | A1 | * | 9/2009 | Hickenbottom | A01B 35/28 172/21 |
| 2010/0198444 | A1 | * | 8/2010 | Jensen | A01B 69/006 701/26 |
| 2011/0203816 | A1 | * | 8/2011 | Hurley | A01B 45/02 172/21 |
| 2015/0021059 | A1 | * | 1/2015 | Hennes | A01B 21/083 172/599 |
| 2018/0228073 | A1 | * | 8/2018 | Milford | A01B 23/043 |

* cited by examiner

UNIVERSAL FRAME AND IMPLEMENT SYSTEM

CROSS-REFERENCE TO RELATED APPLICATIONS

This non-provisional application claims priority under 35 U.S.C. § 119(e) to U.S. provisional application entitled "UNIVERSAL FRAME AND IMPLEMENT SYSTEM," filed on Feb. 10, 2017 and assigned application Ser. No. 62/457,513, the entire contents of which are hereby incorporated by reference.

BACKGROUND

The present invention relates to a universal frame and implement system and, more particularly, to a small tractor or ATV pull-behind system that includes a universal frame configured for easy changeover of agricultural implements. There is a rising demand from large-scale gardeners, outdoor enthusiasts, private landowners, landscapers and the like for land prep and maintenance equipment that can be pulled behind small tractors, vehicles, ATVs, etc. Typical land prep and maintenance equipment used by commercial farmers is impractical for non-commercial applications due to its size and cost. Additionally, smaller scale land prep and maintenance equipment known in the art tends to be either expensive and limited in application or poorly constructed in order to meet a market price point.

Therefore, what is needed in the art is robustly constructed small-scale land prep and maintenance equipment suitable for being pulled behind a small tractor, truck or ATV. Moreover, what is needed in the art is a small-scale land prep and maintenance equipment system that includes a universal frame configured for use with multiple implements so that the cost of ownership of multiple implements may be kept at a minimum.

BRIEF SUMMARY OF THE INVENTION

Various embodiments, aspects and features of the present invention comprise a small-scale land prep and maintenance equipment system that includes a universal frame configured for use with multiple implements. The universal frame includes a tongue element that includes an implement connection point (such as a through-hole or threaded hole) configured for receiving a saddle and bolt aspect of an implement. Advantageously, the implement connection point of the universal frame and the saddle of the implement provide for a robust and rigid connection between the universal frame and an implement while also enabling quick changeover of landscaping implements. Moreover, because the universal frame may be used on any number of implements, the cost of an integrated frame in each implement is avoided.

An exemplary embodiment of a universal frame and implement system according to the solution comprises a frame component comprising a tongue, a vertically adjustable hitch, a lifting mechanism, and at least one wheel, wherein the tongue comprises at least a first hole. The universal frame may also include an axle. Also comprised within the exemplary embodiment is at least a first implement comprising a first saddle feature configured to mechanically receive a portion of the tongue. When the first saddle feature mechanically receives the portion of the tongue, the first hole in the tongue is aligned with a first hole in the saddle such that a first fastener component may be mechanically received through the first hole in the tongue and the first hole in the saddle.

Depending on embodiment, the tongue of the frame component may comprise a second hole and the saddle may comprise a second fastener component such that when the portion of the tongue is received into the saddle feature, the second fastener component is received by the second hole. Also, an exemplary embodiment of the solution may include one or more additional implements, each comprising a saddle feature configured to mechanically receive the portion of the tongue of the universal frame component.

The universal frame component may include a lifting mechanism for raising and lowering the frame relative to the ground. Depending on embodiment, the lifting mechanism may be in the form of a manual ratchet jack, an electric actuator, a pneumatic actuator, and/or a PTO driven actuator. Implements are interchangeable to the universal frame and may include, but are not limited to including, a disc harrow, a sub-soiler, a layoff plow, a box blade, an aerator, a cultipacker, a plugger, a landscape rake, and a cultivator. The universal frame component and or a given implement may be constructed from any combination of carbon steel, painted carbon steel, aluminum, stainless steel or any other suitable material of construction.

BRIEF DESCRIPTION OF THE SEVERAL VIEWS OF THE DRAWING

In the Figures, like reference numerals refer to like parts throughout the various views unless otherwise indicated. For reference numerals with letter character designations such as "110A" or "110B", the letter character designations may differentiate two like parts or elements present in the same Figure. Letter character designations for reference numerals may be omitted when it is intended that a reference numeral to encompass all parts having the same reference numeral in all Figures.

DESCRIPTION

The Figures and the related description are offered for illustrative purposes and collectively depict an exemplary embodiment of a small-scale land prep and maintenance equipment system that includes a universal frame configured for use with multiple implements. As such, although the exemplary embodiments shown in the Figures each depict a single implement in the form of a multi-row cultivator (I.e., an all-purpose plow) or a scraper blade, it is envisioned that embodiments of the solution may include multiple, interchangeable implements configured to be detachably anchored to the universal frame. Indeed, it is an advantage of the solution that a user may easily exchange implements from the frame. Accordingly, it will be understood that the exemplary embodiments shown in the Figures do not illustrate all features and aspects that may be included in a given embodiment of the solution, particularly with regard to the numerous and varied envisioned implements. For instance, it is envisioned that any embodiment of the solution may include any one or more of, but not limited to any one or more of, a disc harrow, sub-soiler, layoff plow, box blade, aerator, cultipacker, plugger, landscape rake, cultivator, etc.

Further, although the solution is described herein within the context of a "small-scale" application such as may be the need for a non-commercial landowner, gardener or landscaper, it is envisioned that embodiments of the solution, or components thereof, may vary in size and/or configuration depending on the particular intended use of the system. Further, although embodiments of the solution shown and described herein depict a manually operated piston for "lifting" an implement when the system is in use (or lifting the universal frame from a disengaged implement), it is envisioned that embodiments of the solution may comprise a pneumatic or hydraulic power source such as may be driven by a power take-off ("PTO"), as would be understood by one of ordinary skill in the art.

Also, it is envisioned that embodiments of the solution may be constructed from any material, or combination of materials, suitable for any given one or more applications. For example, a given embodiment of the system may include a universal frame constructed from aluminum and one or more implements constructed from powder coat painted carbon steel. Other embodiments of the system may include components constructed from a given grade of stainless steel, a galvanized steel, a plated steel, iron, or the like. As such, it will be understood that the scope of the solution is not limited by the materials of construction, or combination of materials, used for a given embodiment.

Figure 1:
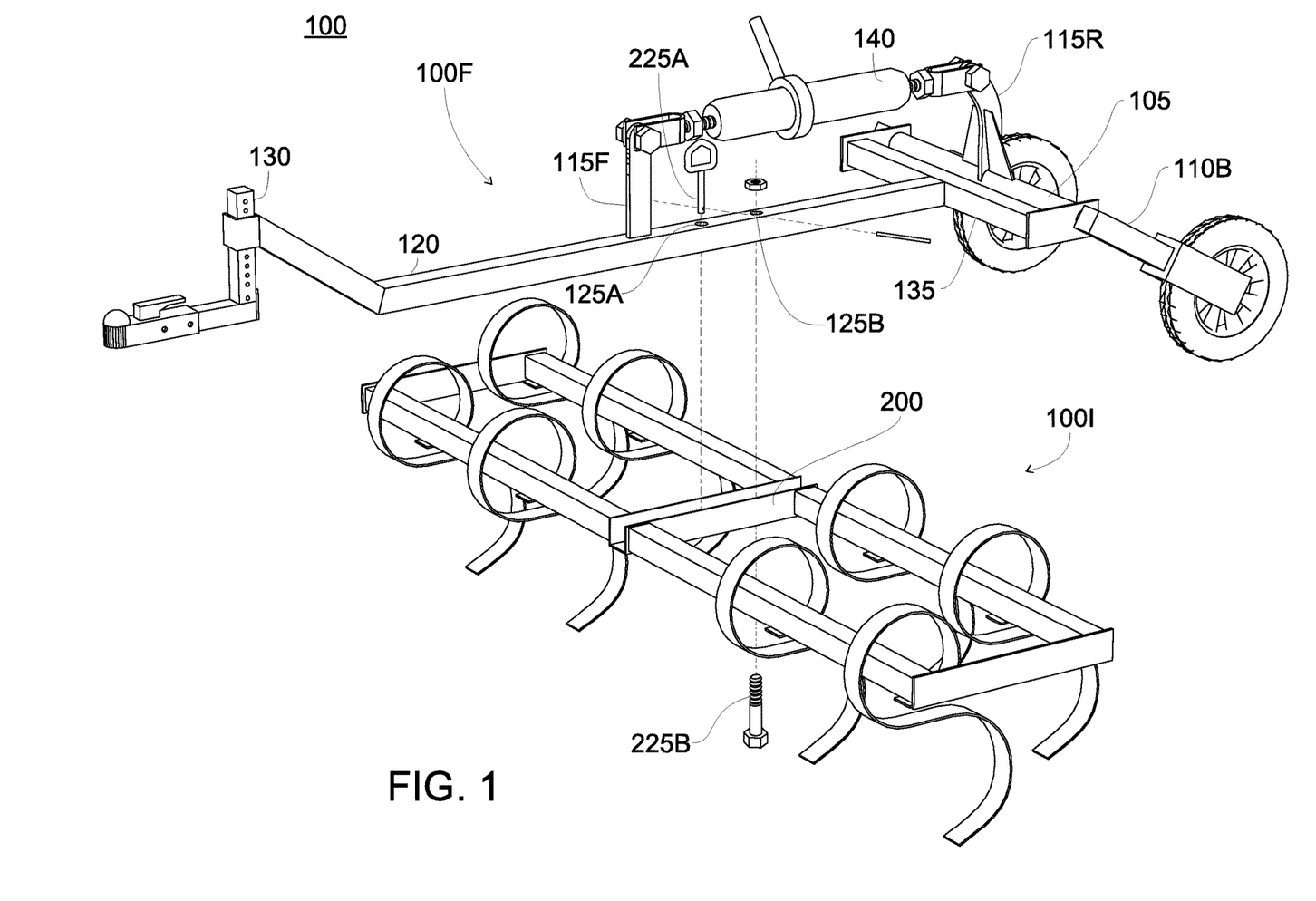
FIG. 1 is a perspective, exploded view of an exemplary embodiment of a universal frame and implement system according to the solution.
Figure 2:
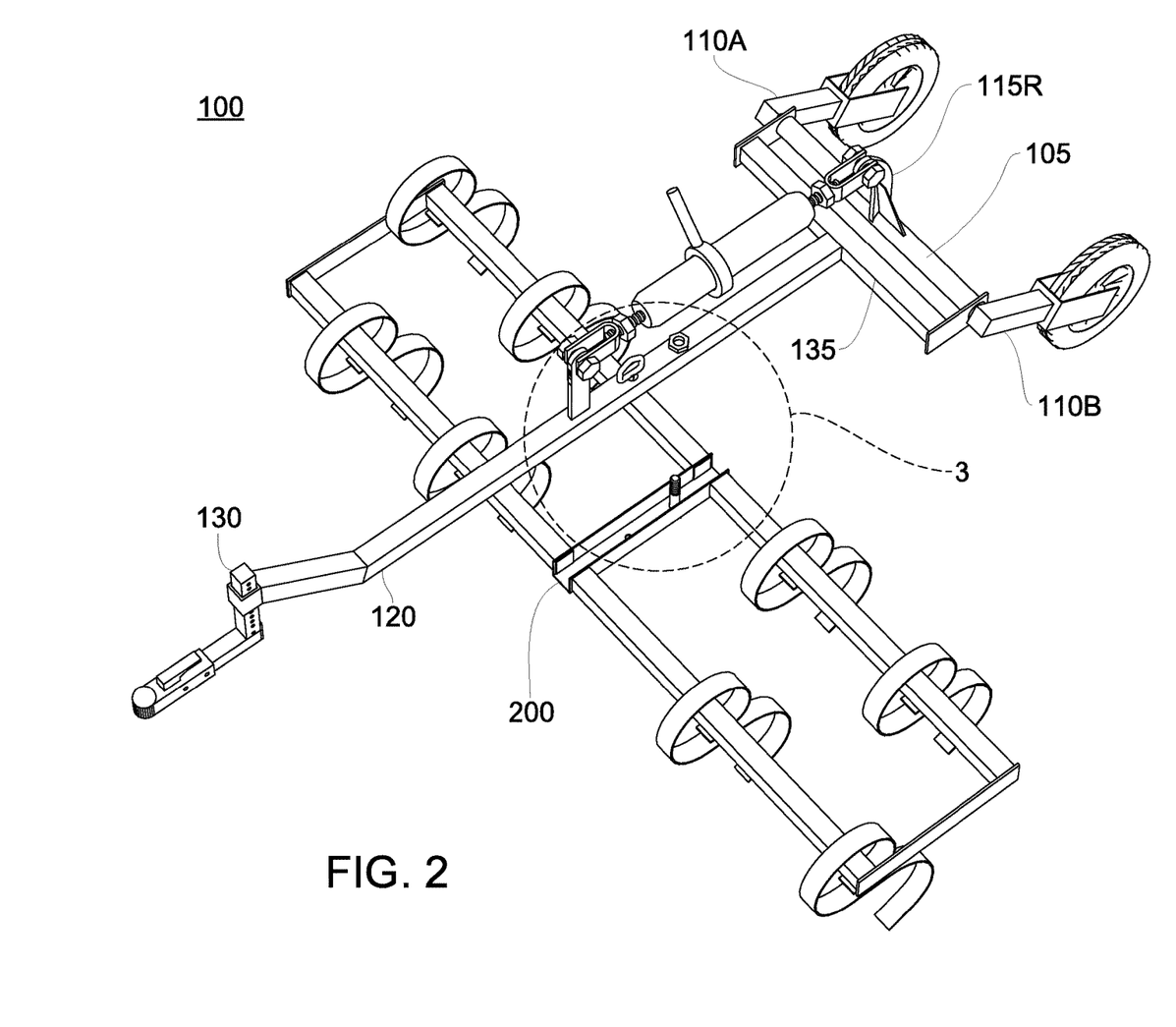
FIG. 2 is a top perspective, exploded view of the exemplary embodiment of a universal frame and implement system shown in FIG. 1.

FIG. 1 is a perspective, exploded view of an exemplary embodiment 100 of a universal frame and implement system according to the solution. FIG. 2 is a top perspective, exploded view of the exemplary embodiment of a universal frame and implement system shown in FIG. 1. The illustrations in FIG. 1 and FIG. 2 will be described coextensively. As can be seen and understood from the FIG. 1 and FIG. 2 illustrations, the exemplary embodiment 100 includes a universal frame 100F and an implement 100I. As described above, the particular implement 100I shown is an example of a multi-row cultivator or all-purpose plow, as would be understood by one of ordinary skill in the art of landscaping and agricultural applications, and does not limit the scope of the solution to implements in the form of a multi-row cultivator or all-purpose plow.

The universal frame 100F includes a tongue element 120 that includes a vertically adjustable hitch 130 at one end and, at its end distal to the hitch 130, a crossbar 135 perpendicular to the tongue element 120. Mounted parallel to and behind the crossbar 135 is an axle 105 with wheel brackets 110A, 110B. Substantially in the middle of the axle 105 is a rear anchor point 115R for mounting of a manual ratchet jack 140 that connects to a forward anchor point 115F located on tongue 120. The manual ratchet jack 140, when anchored to anchor points 115, may be used to lift the universal frame 100F.

Notably, although the lifting mechanism illustrated is in the form of a manual ratchet jack, as previously stated it is envisioned that certain embodiments of the solution may use an electrically or pneumatically operated lift mechanism. Regardless of the particular type of lift mechanism that may be incorporated in a given embodiment of the solution, it can be understood from the drawings that actuation of the lift mechanism may lower or raise the frame 100F relative to the ground and, by extension, may lower or raise an implement 100I that is mechanically fixed to the frame 100F. As the frame 100F is "lifted" via the lifting mechanism, the wheel brackets 110 may "swing" or "sweep" up or down in order to maintain contact with the ground. Advantageously, because the frame 100F may be lifted in such a manner, mechanically attached implements 100I may be easily raised or lowered to provide clearance when needed (such as, for example, when a user requires the system 100 to be crossed over a sidewalk or some other structure).

Figure 3:
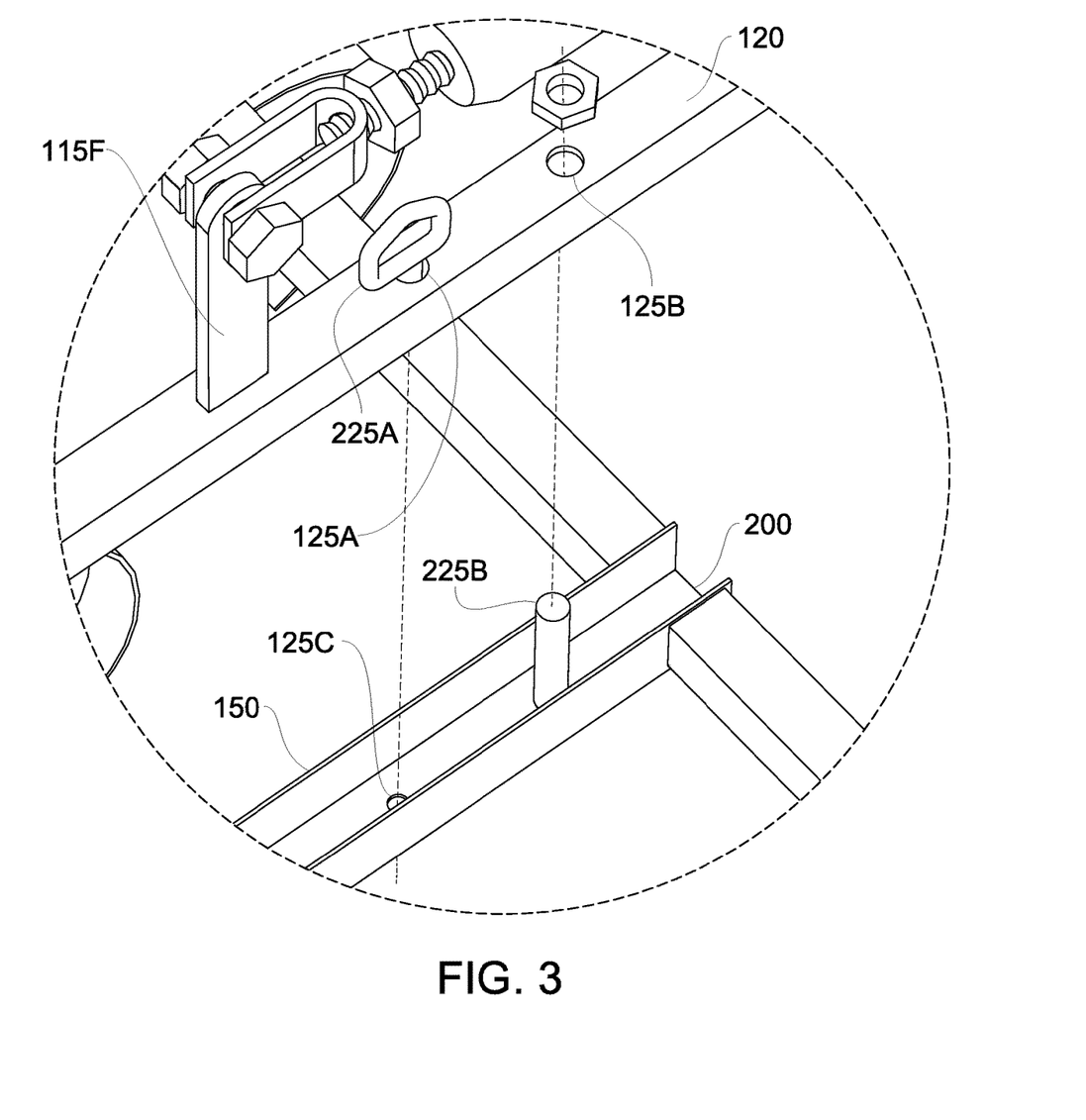
FIG. 3 is a close-up view of the portion of the exemplary embodiment of a universal frame and implement system indicated in the FIG. 2 illustration.

The tongue 120 also includes a pair of implement connection points 125. As will be more easily understood from the FIG. 3 illustration, the implement connection points 125 may provide a means for mechanically interfacing the frame 100F with the implement 100I via a bolt, pin, or the like 225. The implement 100I includes a saddle aspect 200 configured to receive the tongue 120 of the frame 100F. The saddle aspect 200 may include a pin or bolt 225B that may be aligned with and inserted through connection point 125B so that the implement 100I is aligned with frame 100F. A second pin or fastener 225A, for example a drop-in pin, may be subsequently inserted through a correspondingly aligned connection point 125A.

To engage an implement, such as 100I, to a frame 100F, a user may set the lifting mechanism (e.g., ratchet jack 140) such that the crossbar 135 and axle 105 are lifted off the ground to a height that is higher than the bottom of saddle 200. Subsequently, the tongue 120 may be lifted to a comparable height, or higher, such that the frame 100F may be rolled into place above the implement 100I. Once positioned over the implement 100I, the tongue 120 of the frame 100F may be lowered such that a connection point 125 is positioned to receive a frame connection feature 225 such as a bolt or pin.

FIG. 3 is a close-up view of the portion of the exemplary embodiment of a universal frame and implement system 100 indicated in the FIG. 1 and FIG. 2 illustrations. As can be seen in more detail from the FIG. 3 illustration, an exemplary saddle aspect 200 comprises a "u-channel" that includes sides 150, frame connection feature 225B (such as a bolt) and connection point 125C. Notably, although the exemplary embodiment of the universal frame and implement system 100 depicted in FIG. 3 (and FIGS. 1-2) includes two frame connection features 225, it is envisioned that embodiments of the solution may include less than, or more than, two connection features.

The saddle 200 may receive the tongue 120 of the universal frame 100F such that the frame connection feature(s) 225 mechanically mate with a corresponding connection point(s) 125 of implement 100I and frame 100F. In this way, a robust and rigid mechanical connection may be achieved between an implement 100I and a universal frame 100F. As depicted, the frame connection feature 225B within the saddle 200 may be permanently fixed in place in some embodiments such that it may be used as a positioning pin that initially connects frame 100F to implement 100I before a second frame connection feature 225A, for example, is inserted and mechanically fastened.

Figure 4:
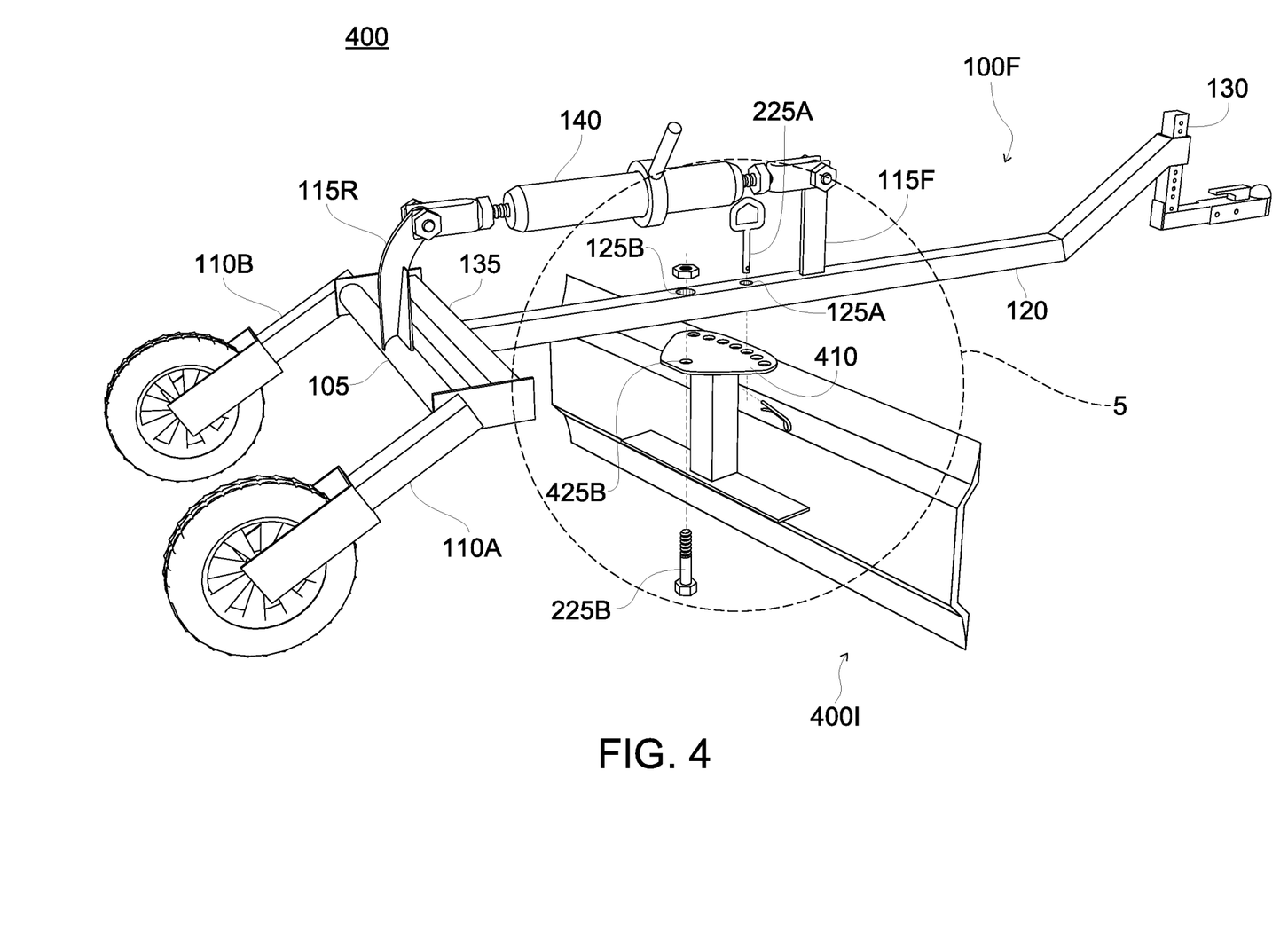
FIG. 4 is a perspective, exploded view of another exemplary embodiment of a universal frame and implement system according to the solution.

FIG. 4 is a perspective, exploded view of another exemplary embodiment of a universal frame and implement system according to the solution. As can be seen and understood from the FIG. 4 illustration, the exemplary embodiment 400 includes a universal frame 100F and an implement 400I. Similar to that which was described above, the particular implement 400I shown is an example of a scraper blade, as would be understood by one of ordinary skill in the art of landscaping and agricultural applications, and does not limit the scope of the solution to implements in the form of a scraper blade.

The universal frame 100F includes a tongue element 120 that includes a vertically adjustable hitch 130 at one end and, at its end distal to the hitch 130, a crossbar 135 perpendicular to the tongue element 120. Mounted parallel to and behind the crossbar 135 is an axle 105 with wheel brackets 110A, 110B. Substantially in the middle of the axle 105 is a rear anchor point 115R for mounting of a manual ratchet jack 140 that connects to a forward anchor point 115F located on tongue 120. The manual ratchet jack 140, when anchored to anchor points 115, may be used to lift the universal frame 100F.

Notably, although the lifting mechanism illustrated is in the form of a manual ratchet jack, as previously stated it is envisioned that certain embodiments of the solution may use an electrically or pneumatically operated lift mechanism. Regardless of the particular type of lift mechanism that may be incorporated in a given embodiment of the solution, it can be understood from the drawings that actuation of the lift mechanism may lower or raise the frame 100F relative to the ground and, by extension, may lower or raise an implement 400I that is mechanically fixed to the frame 100F. As the frame 100F is "lifted" via the lifting mechanism, the wheel brackets 110 may "swing" or "sweep" up or down in order to maintain contact with the ground. Advantageously, because the frame 100F may be lifted in such a manner, mechanically attached implements 400I may be easily raised or lowered to provide clearance when needed (such as, for example, when a user requires the system 400 to be crossed over a sidewalk or some other structure).

Figure 5:
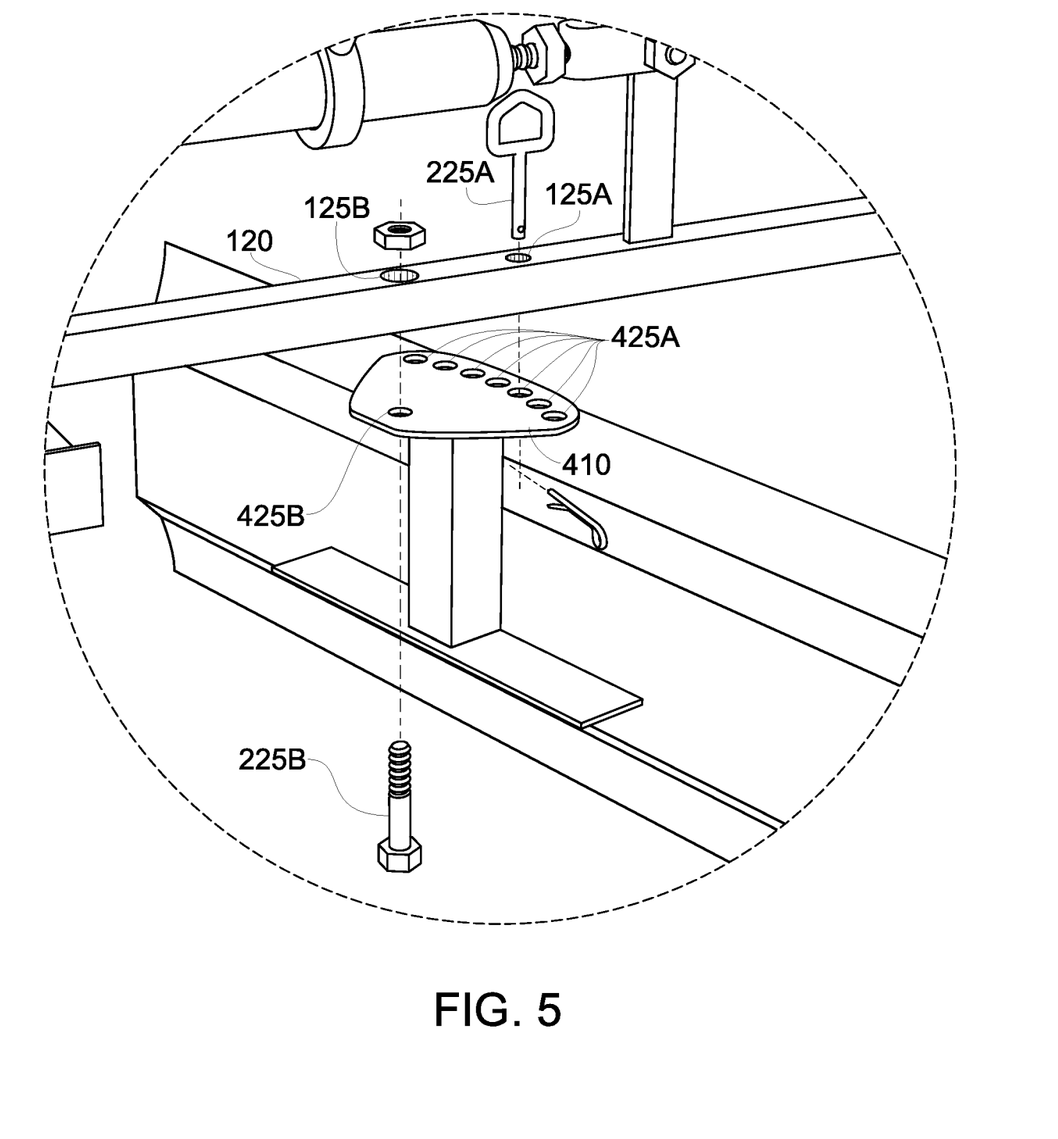
FIG. 5 is a close-up view of the portion of the exemplary embodiment of a universal frame and implement system indicated in the FIG. 4 illustration.

The tongue 120 also includes a pair of implement connection points 125. As will be more easily understood from the FIG. 5 illustration, the implement connection points 125 may provide a means for mechanically interfacing the frame 100F with the implement 400I, and adjusting the angle of implement 400I relative to frame 100F, via a bolt, pin, or the like 225. The implement 400I includes a connection plate aspect 410 configured to receive the tongue 120 of the frame 100F and angularly adjust the position of implement 400I. The connection plate aspect 410 may include a pin or bolt 225B that may be aligned with and inserted through connection points 425B and 125B so that the implement 400I is adjustably connected with frame 100F. A second pin or fastener 225A, for example a drop-in pin, may be subsequently inserted through correspondingly aligned connection point 125A and one of 425A in order to mechanically fix the angular position of implement 400I relative to frame 100F.

To engage an implement, such as 400I, to a frame 100F, a user may set the lifting mechanism (e.g., ratchet jack 140) such that the crossbar 135 and axle 105 are lifted off the ground to a height that is higher than the top of connection plate aspect 410. Subsequently, the tongue 120 may be lifted to a comparable height, or higher, such that the frame 100F may be rolled into place above the implement 400I. Once positioned over the implement 400I, the tongue 120 of the frame 100F may be lowered such that a connection point 125 is positioned to receive a frame connection feature 225 such as a bolt or pin.

FIG. 5 is a close-up view of the portion of the exemplary embodiment of a universal frame and implement system 400 indicated in the FIG. 4 illustration. As can be seen in more detail from the FIG. 5 illustration, an exemplary connection plate aspect 410 comprises a frame connection feature 425B and two or more angular adjustment connection points 425A.

The connection plate aspect 410 may receive the tongue 120 of the universal frame 100F on top of it such that the frame connection feature(s) 225 mechanically mate with a corresponding connection point(s) 425 of implement 400I and frame 100F. In this way, a robust and rigid mechanical connection may be achieved between an implement 400I and a universal frame 100F. As depicted, the frame connection feature 225B may be permanently fixed through connection point 425B in some embodiments such that it may be used as a positioning pin that initially connects frame 100F to implement 400I before a second frame connection feature 225A, for example, is inserted and mechanically fastened to set the angle of the implement 400I.

Systems, devices and methods for the universal frame and implement system have been described using detailed descriptions of embodiments thereof that are provided by way of example and are not intended to limit the scope of the disclosure. The described embodiments comprise different features, not all of which are required in all embodiments of a universal frame and implement system. Some embodiments of a universal frame and implement system utilize only some of the features or possible combinations of the features. Variations of embodiments of a universal frame and implement system that are described and embodiments of a universal frame and implement system comprising different combinations of features noted in the described embodiments will occur to persons of the art.

It will be appreciated by persons skilled in the art that systems, devices and methods for the provision of a universal frame and implement system is not limited by what has been particularly shown and described herein above. Rather, the scope of systems, devices and methods for the provision of a universal frame and implement system is defined by the claims that follow.

What is claimed is:

1. A universal frame and implement system, comprising:
    a non-motorized frame component configured to be towed, the frame component comprising a tongue, a hitch, a lifting mechanism, and at least one wheel, wherein the tongue comprises at least a first hole; and
    a separable first implement comprising a first saddle feature configured to mechanically receive a portion of the tongue, wherein the saddle feature comprises a bottom surface and two vertical side walls that cooperate to define an open topped channel;
    wherein when the portion of the tongue is received into the saddle feature, the bottom surface of the saddle feature is positioned beneath said portion of the tongue and the first hole in the tongue is aligned with a first hole in the bottom surface of the saddle; and
    wherein a first fastener component is mechanically received through the first hole in the tongue and the first hole in the bottom surface of the saddle.

2. The universal frame and implement system of claim 1, wherein:
    the tongue comprises a second hole and the saddle comprises a second fastener component; and
    when the portion of the tongue is received into the saddle feature, the second fastener component is received by the second hole.

3. The universal frame and implement system of claim 1, further comprising:
    one or more additional implements, each comprising a saddle feature having a bottom surface and two vertical side walls that cooperate to define an open topped channel configured to mechanically receive the portion of the tongue such that the bottom surface of the saddle feature is positioned beneath said portion of the tongue.

4. The universal frame and implement system of claim 1, further comprising:
one or more additional implements, at least one of which comprises a connection plate aspect configured to mechanically receive the portion of the tongue and angularly adjust the at least one implement relative to the tongue.

5. The universal frame and implement system of claim 1, wherein the lifting mechanism is comprised of a manual ratchet jack.

6. The universal frame and implement system of claim 1, wherein the lifting mechanism is comprised of an electric actuator.

7. The universal frame and implement system of claim 1, wherein the lifting mechanism is comprised of a pneumatic actuator.

8. The universal frame and implement system of claim 1, wherein the lifting mechanism is configured to be driven by a power take-off ("PTO").

9. The universal frame and implement system of claim 1, wherein the first implement is selected from a group comprised of a disc harrow, a sub-soiler, a layoff plow, a box blade, an aerator, a cultipacker, a plugger, a landscape rake, and a cultivator.

10. The universal frame and implement system of claim 1, wherein at least one of the frame component and first implement is comprised of carbon steel.

11. The universal frame and implement system of claim 1, wherein at least one of the frame component and first implement is comprised of painted carbon steel.

12. The universal frame and implement system of claim 1, wherein at least one of the frame component and first implement is comprised of aluminum.

13. The universal frame and implement system of claim 1, wherein at least one of the frame component and first implement is comprised of stainless steel.

14. The universal frame and implement system of claim 1, wherein the hitch is a vertically adjustable hitch.

15. The universal frame and implement system of claim 1, wherein the frame component further comprises an axle.

* * * * *